April 12, 1927.　　　A. M. MALLUK　　　1,624,840
LOCKABLE COVER FOR AUTOMOBILE FUEL TANKS
Filed Dec. 31, 1924　　　3 Sheets-Sheet 1
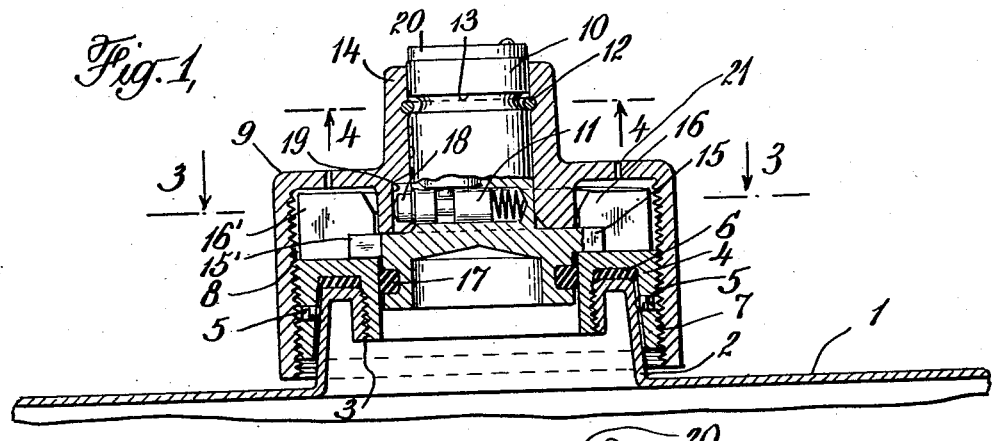
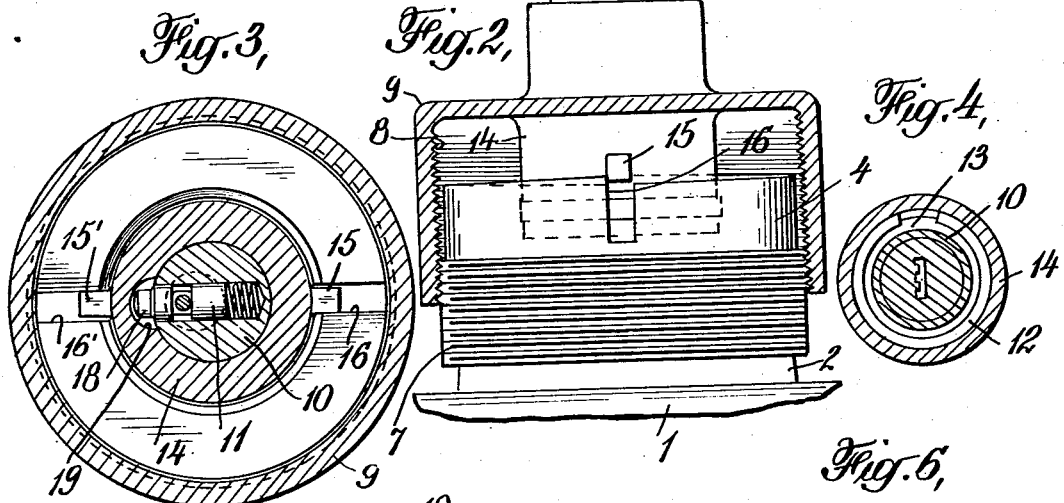
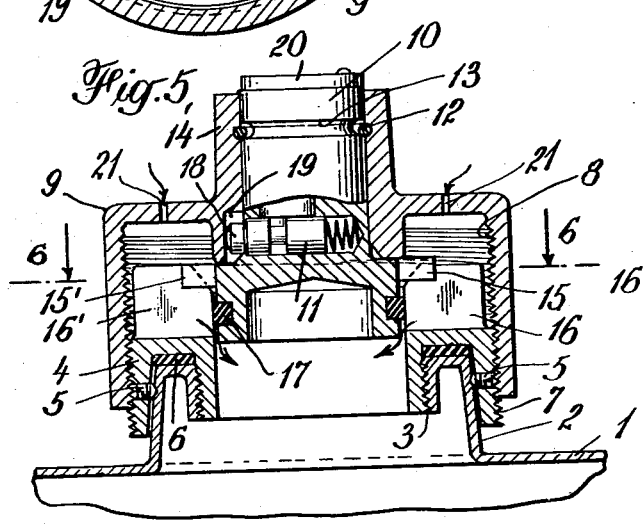
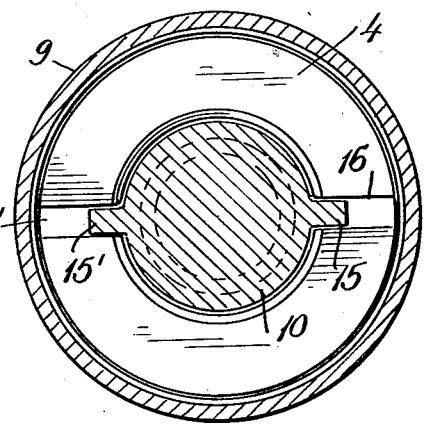
INVENTOR
A. M. Malluk
BY
ATTORNEY April 12, 1927.  A. M. MALLUK  1,624,840
LOCKABLE COVER FOR AUTOMOBILE FUEL TANKS
Filed Dec. 31, 1924  3 Sheets-Sheet 2
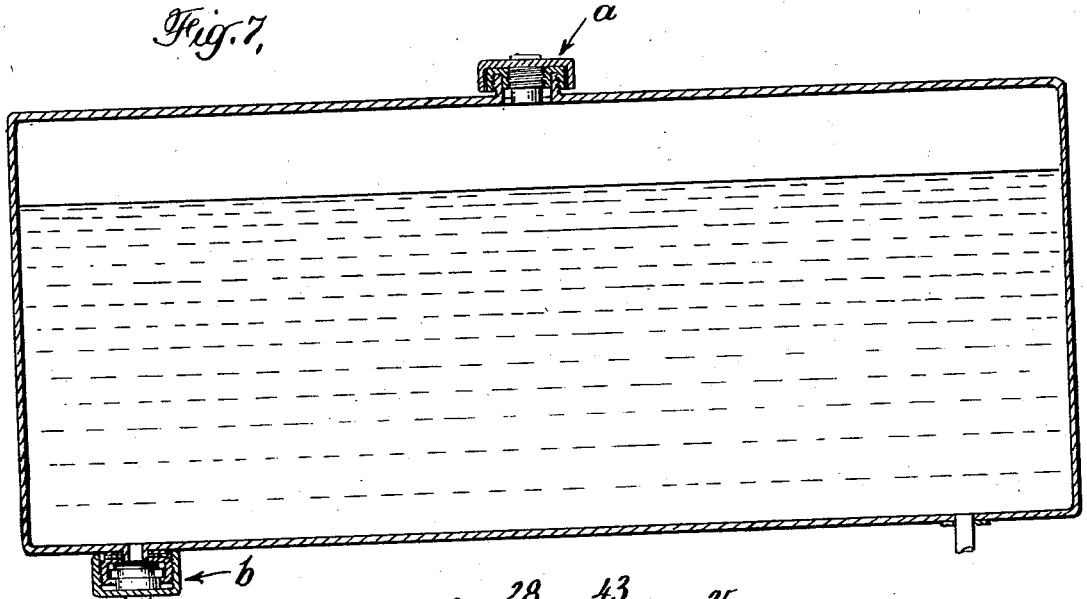
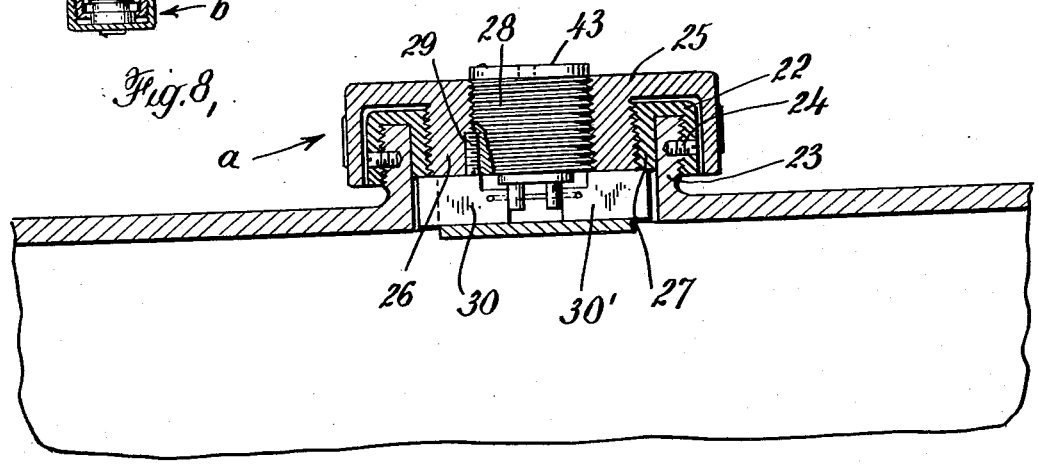
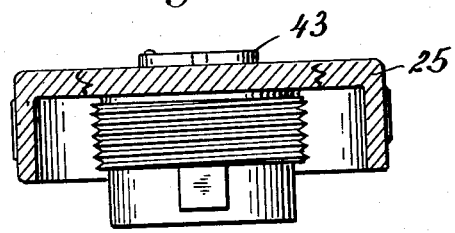
INVENTOR
BY
ATTORNEY April 12, 1927. 1,624,840
A. M. MALLUK
LOCKABLE COVER FOR AUTOMOBILE FUEL TANKS
Filed Dec. 31, 1924 3 Sheets-Sheet 3
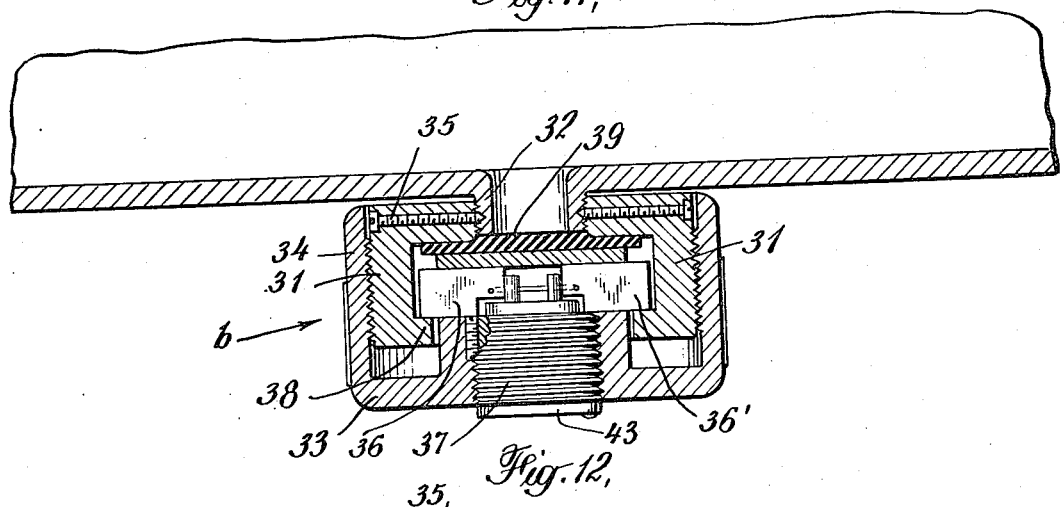
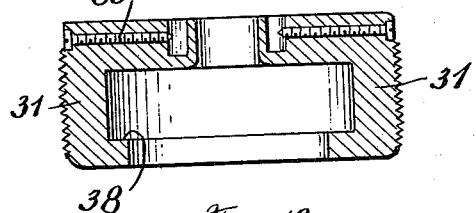
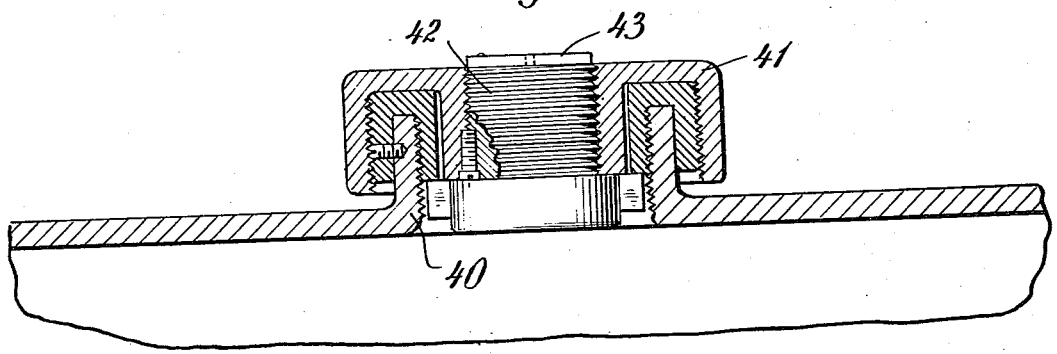
INVENTOR
*A. M. Malluk*
BY
*Bennie Davis Marvin & Edmonds*
ATTORNEY Patented Apr. 12, 1927.

1,624,840

UNITED STATES PATENT OFFICE.

ASSAD M. MALLUK, OF NEW YORK, N. Y., ASSIGNOR TO YANKEE LOCK CORPORATION, OF NEW YORK, N. Y., A CORPORATION OF NEW YORK.

LOCKABLE COVER FOR AUTOMOBILE FUEL TANKS.

Application filed December 31, 1924. Serial No. 759,000.

This invention relates to closures for fuel tanks, and more particularly, to lockable closures or covers for the fuel tanks of automobiles. This invention was devised with a view to preventing the unauthorized removal of the filling cap of an automobile fuel tank, and in this way prevent the theft of gasolene from the tank.

The lockable covers for fuel tanks heretofore devised have not been entirely satisfactory for a number of reasons. In the first place, a cap for a filling neck having locking mechanism therein is necessarily fairly expensive and when it is considered that the filling necks of different makes of automobiles are of various sizes, it is evident that if the ordinary lockable cover is to be used, it must be made in a correspondingly large number of sizes. This would involve an expense which would practically prohibit the successful exploitation of such devices. The ordinary lockable covers are also unsatisfactory because they are not suited to the requirements of all types of automobiles. For some types the cap for the filling neck should form an air-tight seal, while for others it is necessary to have a small air port for the purpose of admitting air to the tank as the fuel is withdrawn therefrom.

The present invention was devised with a view to doing away with the necessity of making the cover in a large number of sizes and with a view to providing a cover which can be adjusted so as to admit the entrance of air into the tank or to form an air-tight seal as may be desired. I have found that it is necessary to make only a few standard size caps if an adapting ring is employed between the cap and the filling neck. The adapting ring consists of a collar which can be fixed to a filling neck and serves the purpose of changing the effective size of the neck to a standard size for receiving a standard filling cap. The adapting ring is not expensive to manufacture and can be made in a variety of sizes to fit the filling necks provided on various makes of automobiles. In this way a small number of different sized filling caps can be used on fuel tanks, the filling necks of which vary in size throughout a wide range.

I prefer to construct the adapting ring or collar so that it performs a function in addition to changing the effective size of the filling neck. The adapting ring can be provided with an abutment cooperating with the locking mechanism carried by the cap. Thus, if the adapting ring is permanently fixed to the filling neck, the filling cap can be securely locked to the tank by locking it to the adapting ring. I prefer to provide an air-tight connection between the adapting ring and the filling neck so as to prevent the passage of air between these parts.

The locking mechanism which I prefer to use comprises a cylinder loosely mounted in the filling cap. This cylinder is mounted so that it can be rotated with respect to the cap except when locking devices within the cylinder lock the cylinder to the cap. The cylinder carries a lug adapted to engage the abutment on the adapting ring or collar whereby the relative rotation of these parts is prevented as soon as the lug engages the abutment. The cylinder also carries a packing ring which cooperates with the adapting ring to provide an air-tight seal between these parts when the cap is in a certain position. When the cap occupies a different position an air passage is provided between the interior of the filling neck and the inside of the cap. I prefer to make one or more openings in the cap, so that unless the packing ring is in a position to form a seal for the filling neck, air can flow freely into the tank through the filling neck.

My invention can be best understood by considering the following detailed description which is to be taken in conjunction with the accompanying drawings, in which Figure 1 is a vertical section view of one embodiment of my improved lockable cover.

Figure 2 is an elevation partly in section of the device shown in Figure 1 illustrating the mode of operation thereof.

Figure 3 is a transverse section taken on line 3—3 of Figure 1 showing details of construction.

Figure 4 is a transverse section taken on line 4—4 of Figure 1 showing details of construction.

Figure 5 is a vertical section view of the device shown in Figure 1, the cap occupying a different position than shown in Figure 1.

Figure 6 is a transverse section taken on line 6—6 of Figure 5 showing details of construction.

Figure 7 is a transverse section view of a fuel tank having another embodiment of the invention applied thereto.

Figure 8 is an enlarged transverse section view of the lockable cover shown at the top of Figure 7.

Figure 9 is a transverse section view of the cap shown in Figure 8.

Figure 10 is a transverse section view of the adapting ring shown in Figure 8.

Figure 11 is a vertical section view of the lockable cover shown at the bottom of Figure 7.

Figure 12 is a vertical section view of the adapting ring shown in Figure 10, and Figure 13 is a vertical section view of another embodiment of my invention.

In Figures 1, 2 and 5 I have shown a portion of the top of a fuel tank 1 having a filling neck 2 internally threaded as shown at 3. An adapting ring or collar 4 is shown fixed to the filling neck 2. The adapting ring is provided with screw threads engaging the threads 3 on the filling neck and the adapting ring is held against rotation by means of one or more set screws 5 which engage the filling neck. I prefer to use a packing washer 6 between the rim of the filling neck and the adapting ring so as to form an air-tight connection between these parts so that air cannot get into the tank between the adapting ring and the filling neck. The adapting ring is provided with screw threads 7 adapted to be engaged by screw threads 8 on the filling cap 9. It will be readily understood that the adapting ring can be cheaply made in a large variety of sizes so as to fit all kinds of filling necks, the adapting ring being always provided with a threaded portion such as that indicated at 7 adapted to receive the filling cap.

My improved cap as shown in Figures 1 to 6 inclusive comprises a cup-shaped member threaded internally as shown at 8 and adapted to receive a cylinder 10 containing locking mechanism 11 of any well-known type such as the mechanism employed in Yale locks. The cylinder 10 is rotatably mounted in the cap 9 and is prevented from slipping out of the cap by a locking ring 12 which fits into an annular groove 13 in the cylinder 10 and in a corresponding annular channel in the raised portion 14 of the filling cap. The radius of curvature of the annular channel 13 in the cylinder 10 is preferably appreciably larger than the radius of the spring wire 12, thus providing an appreciable amount of play between the cylinder 10 and the cap 9. This longitudinal play is desirable for it permits a certain amount of vertical movement of the lugs 15 and 15' carried by the cylinder 10 at the lower end thereof. These radially disposed lugs 15 and 15' are adapted to strike against abutments 16 and 16' provided on the adapting ring 4.

The abutments 16 and 16' are formed in the manner best shown in Figure 2. One or more notches are cut in the upper part of the adapting ring and the top surface of the ring is cut away or beveled so that one side of the notch is longer than the other side. The surface of the top of the adapting ring adjacent to the shorter side of the notch is cut away at an angle corresponding with the pitch of the threads 7 and 8. Thus when the cap 9 with the locking mechanism therein is screwed down onto the adapting ring, the lugs 15 and 15' rotate until they strike against the abutments 16 and 16' as will be readily understood. Further rotation of the cap 9 produces relative rotation between the cylinder 10 and the cap because of the fact that the cylinder 10 is now locked to the adapting ring. This further rotation of the cap cannot occur, however, unless the locking mechanism 11 in the cylinder is in its unlocked position. If this is the case, the cap can be screwed down until the lugs 15 and 15' engage the bottoms of the notches in the adapting ring as shown in Figure 1. When the parts occupy this position, an air-tight connection is formed between the inside of the adapting ring 4 and the lower portion of the cylinder 10 by virtue of a packing ring 17 carried by the lower portion of the cylinder. If the locking mechanism 11 is now moved to its locked position, that is, until the bolt 18 projects into a slot or cavity 19 in the cap, all of the parts are securely locked in place and the cap cannot be removed without the use of a key. A suitable key-hole cover 20 is provided at the upper end of cylinder 10 for the purpose of preventing dirt from entering the key-hole and getting into the locking mechanism.

If the locking mechanism is released or unlocked and the cap unscrewed until the lugs 15 and 15' are near the tops of the notches in the adapting ring, then the packing ring 17 clears the lower portions of the notches in the adapting ring, thus providing air ports connecting the inside of the cap 9 with the inside of the filling neck. I prefer to make one or more openings or vents 21 in the cap 9 so that the air can flow as indicated by the arrows in Figure 5. The parts can be locked in this raised position shown in Figure 5 by merely operating the locking mechanism to cause the bolt 18 thereof to enter the cavity 19 in the cover. The parts when locked in this position are as effectively held in place as though they were locked in the lower position with the packing ring 17 forming an air-tight seal for the filling neck.

The embodiment of my invention described in detail above is particularly useful because of its applicability to not only the type of automobile in which it is necessary to have the filling cap air-tight, but to the type in which it is desirable to have an air-port in the filling cap. By merely screwing the cap down to the desired point, the air ports can be shut off or opened as desired. Even where under normal operating conditions it is desirable to have the tank open to the air, this cap is of value because when the car is not in use, the cap can be screwed down tight for the purpose of preventing the unauthorized withdrawal of gasolene from the bottom of the tank.

In Figure 7 I have illustrated a fuel tank having top and bottom ports closed by lockable covers made in accordance with my invention. The top cover *a* is shown in enlarged form in Figure 8 and the bottom cover *b* of Figure 7 is shown in enlarged form in Figure 11.

The embodiment of my invention shown in Figure 8 includes an adapting ring 22 fixed to an externally threaded filling neck 23 by set screws 24. The cap 25 has an externally threaded portion 26 engaging an internally threaded portion 27 of the adapting ring 22. A locking mechanism encased in a suitably externally threaded cylinder 28 is mounted in the center of the cap 25 and this cylinder is locked against rotation by a set screw 29. The locking mechanism actuates 2 radially disposed bolts 30 and 30' which engage the underside of the portion 27 of the adapting ring which extends down into the filling neck. It will be noted that in all of the embodiments of the invention illustrated in the accompanying drawings the filling cap extends down so as to cover the set screws which lock the adapting ring in place.

The embodiment of the invention shown in Figures 8 to 10 inclusive is very satisfactory for the type of automobile which requires an air port in the fuel tank. The air can gain access into the tank through the key-hole and locking mechanism and around the bolts 30 and 30'.

The embodiment of my invention illustrated in Figures 11 and 12 illustrates the application thereof to a very small neck such as that oftentimes provided on the bottom of an automobile fuel tank. This embodiment of the invention provides an air-tight seal for the opening leading into the tank. The adapting ring 31 is constructed so as to enlarge the effective diameter of the neck 32 to receive the cap 33. The inside of the rim 34 of the cap 33 is provided with screw threads engaging corresponding threads on the periphery of the adapting ring 31. The adapting ring is fixed to the neck 32 by means of set screws 35. The bolts 36 and 36' of the locking mechanism indicated generally by the reference character 37, instead of engaging the portion of the adapting ring furthest from the face of the cap, engage a ledge or annular shoulder 38 as shown. A packing disc 39 covers the mouth of the neck 32 and is pressed in place by the cap.

The embodiment of the invention illustrated in Figure 13 is similar to that shown in Figure 8 except that the adapting ring 70 engages an internally threaded filling neck 40 instead of the externally threaded neck 23 of Figure 8. The cap 41 of Figure 13 is similar to the cap 33 of Figure 11 in that it is provided with internal screw threads engaging external threads on the adapting ring. The locking mechanism indicated by the reference characters 40 and 42 is centrally disposed in the filling cap the same as in Figures 8 and 11, a suitable key-hole cover 43 being provided in each instance.

It is to be understood that my invention is not limited to the particular embodiments illustrated and described, but includes such modifications thereof as fall within the scope of the appended claims. The various details of construction can be varied to suit particular purposes or conditions. For example, a single lug 15 may be employed in the embodiment of Figures 1 to 6 inclusive instead of the two lugs 15 and 15'. Where this is done, it is not necessary to have more than one abutment 16 as will be readily understood. In addition to the utility of my invention as a lockable closure for fuel tanks, it is of value as applied to such devices as gasolene gauges commonly mounted in the tops of automobile fuel tanks. My invention can of course be used with tanks and receptacles of various kinds other than automobile fuel tanks.

I claim:

1. In a closure for fuel tanks of automobiles, the combination with a tank having a filling neck, of a ring engaging the filling neck and having screw threads thereon, a cap adapted to be screwed onto said ring, a cylinder rotatably mounted in said cap, means for preventing relative rotation between said cylinder and said ring, and locking mechanism including a bolt rotatably carried by said cylinder, said cap having an opening therein adapted to receive said bolt, whereby said cylinder may be locked against rotation relative to said cap.

2. In a closure for the fuel tanks of automobiles, the combination with a tank having a filling neck, of a cap for the filling neck, locking mechanism including a bolt rotatably mounted in said cap, means including said bolt for locking said mechanism against rotation with respect to said cap, and an adapting ring fixed to the neck and having an abutment thereon for engagement with said locking mechanism.

3. In a closure for the fuel tanks of automobiles, the combination with a tank having a filling neck, of a cap for the filling neck, locking mechanism mounted in the center of said cap, an adapting ring threaded to said neck and having an air-tight connection therewith, and means normally concealed by said cap for preventing rotation of said ring, the said ring having a notch in the upper edge thereof serving as an abutment for the locking mechanism, part of the upper face of the adapting ring being cut away so that one side of the notch is longer than the other.

4. In a closure for the fuel tanks of automobiles, the combination with a tank having a filling neck, of a cap for the filling neck, a threaded collar fixed to the filling neck and having an abutment near the top thereof, and locking mechanism mounted in the center of said cap and including a cylinder rotatable therein, means for locking the cylinder to the cap, and a lug cooperating with the abutment on the said collar to prevent relative rotation of the collar and cylinder.

5. In a closure for the fuel tanks of automobiles, the combination with a tank having a filling neck, of a cap for the filling neck, a threaded collar fixed to the filling neck and having an abutment near the top thereof, and locking mechanism including a cylinder loosely mounted in said cap so as to be rotatable therein and to have an appreciable amount of longitudinal play therein, means for locking said cylinder to said cap and a lug carried by said cylinder cooperating with the abutment on said collar to prevent relative rotation of the collar and cylinder.

6. In a closure for the fuel tanks of automobiles, the combination with a tank having a filling neck, of a threaded cap for the filling neck, a threaded collar fixed to the filling neck and making an air-tight connection therewith, said collar having a notch therein forming an abutment, locking mechanism including a cylinder rotatably mounted in said cap and having a closed bottom, means for locking said cylinder to said cap, a lug carried by said cylinder and cooperating with the abutment on said collar for preventing relative rotation of the collar and cylinder, and means carried by said cylinder for making an air-tight connection between the cylinder and said collar.

7. In a closure for the fuel tanks of automobiles, the combination with a tank having a filling neck, of a threaded cap for the fuel tank having an air-port therein, a threaded collar fixed to the filling neck and making an air-tight connection therewith, said collar having a notch therein forming an abutment, locking mechanism including a cylinder rotatably mounted in said cap, a locking ring for preventing the removal of said cylinder from said cap, means for locking said cylinder to said cap, a lug carried by said cylinder and cooperating with the abutment on said collar for preventing the relative rotation of the cylinder and collar, and a packing ring carried by said cylinder, the cylinder and locking ring being constructed and arranged so that when the cap is screwed down onto the adapting ring a certain distance, all of the parts can be locked together without forming an air-tight seal, and when the cap is screwed down further, all of the parts can be locked together and the packing ring forms an air-tight seal for the filling neck.

8. In a device of the character described, the combination with a tank having a filling neck, of a ring engaging the filling neck, means for permanently fixing the ring to the neck, a closure member for said ring held against rotation relative to said ring by engagement therewith, and a cap having a screw threaded engagement with said ring and adapted to be locked to said closure member, whereby unauthorized removal of said cap from said ring is prevented.

In testimony whereof I affix my signature.

ASSAD M. MALLUK.